United States Patent
Schwenk

(10) Patent No.: US 8,628,322 B2
(45) Date of Patent: Jan. 14, 2014

(54) MOLD APPARATUS FOR USE IN INJECTION MOLDING OF A LIQUID SILICONE COMPOSITION

(75) Inventor: Terry L. Schwenk, Kenosha, WI (US)

(73) Assignee: Terry L. Schwenk, Kenosha, WI (US)

( * ) Notice: Subject to any disclaimer, the term of this patent is extended or adjusted under 35 U.S.C. 154(b) by 28 days.

(21) Appl. No.: 13/371,453

(22) Filed: Feb. 12, 2012

(65) Prior Publication Data

US 2012/0225159 A1    Sep. 6, 2012

Related U.S. Application Data

(60) Provisional application No. 61/449,258, filed on Mar. 4, 2011.

(51) Int. Cl.
*B29C 45/20* (2006.01)

(52) U.S. Cl.
USPC .......................... 425/547; 425/549; 425/552

(58) Field of Classification Search
USPC ................... 425/547, 548, 549, 552
See application file for complete search history.

(56) References Cited

U.S. PATENT DOCUMENTS

| | | | | |
|---|---|---|---|---|
| 4,622,001 A * | 11/1986 | Bright et al. | ................... | 425/549 |
| 5,055,025 A * | 10/1991 | Muller | ........................... | 425/144 |
| 5,423,670 A * | 6/1995 | Hamel | ........................... | 425/144 |
| 5,705,793 A * | 1/1998 | Kitaichi et al. | ................ | 219/544 |
| 7,134,868 B2 * | 11/2006 | Babin et al. | .................... | 425/549 |
| 2010/0055227 A1* | 3/2010 | Watanabe et al. | ............. | 425/549 |

* cited by examiner

*Primary Examiner* — Tim Heitbrink

(57) ABSTRACT

A mold apparatus used in injection molding of liquid silicone composition. The mold apparatus is made of several components aiding in the overall process. The mold apparatus has two main sections, a cold section to prevent the liquid silicone from curing and a heated section for curing the liquid silicone. The two sections are separated by a thermal insulating plate. The metering of the flow is achieved by an actuator providing linear movement of a valve pin position in the center of the flow path of the runnerless nozzle resting against a gate orifice. The runnerless nozzle is keep cooled with an annular heat pipe surrounding the body of the runnerless nozzle and circulating a liquid coolant at one end of the runnerless nozzle. The cavity block receive heat from an heating element incorporated in the cavity back plate. Heat is evenly distributed in the cavity block by vaporization.

18 Claims, 2 Drawing Sheets

MOLD APPARATUS FOR USE IN INJECTION MOLDING OF A LIQUID SILICONE COMPOSITION

RELATED APPLICATIONS

The present application is a continuation application of U.S. provisional patent application Ser. No. 61/449,258, filed Mar. 4, 2011, for MOLD APPARATUS, by Terry Schwenk, Paul Siodlarz, David Braden, Robert Luce, included by reference herein and for which benefit of the priority date is hereby claimed.

FIELD OF THE INVENTION

The present invention relates to injection molding industry and, more particularly, to apparatus for manufacturing of liquid silicone parts.

BACKGROUND OF THE INVENTION

The present invention relates to injection molding industry and more particularly to runnerless injection mold apparatus for injection molding silicone. The use of runnerless systems for injection molds is well known in the industry. Common silicone parts manufacturing uses a two component liquid composition matter. One component being liquid silicone and the other being the catalyst. When mixed together the composition will begin to cure into a solid. The curing process time, is reduced by subjecting the composition to heat above 100 degrees Celsius. This process is accomplished by the injection molding machine pushing the silicone composition into the runnerless system which distributes the silicone composition into heated cavities where the silicone composition is cured. This is a relatively low pressure process, because of the nature of the silicone composition expands when cured. This process actually fills the cavities to approximately 95% of cavity volume. The cured silicone composition expands the additional 5% to fill the cavity. The runnerless system is designed to distribute the silicone to the mold cavities while keeping the silicone cool, preventing premature curing of the silicone and eliminating waste. Most current silicone molds do not incorporate any runnerless system. The mold is constructed with runner passages to distribute the silicone to the cavities and the entire mold is heated to cure the silicone. The runner passages along with the parts are cured and the runner becomes waste, since once the silicone is cured it cannot be reused. With the high cost of silicone materials, there is a big cost savings using runnerless systems. Current molds being produced for liquid silicone injection molding do not have heaters designed directly into the mold cavities. They typically incorporate a heated mold plate where by the cavities are affixed. Typical mold plates are heated using electric heater rods placed in a mold plate adjacent to the cavity blocks transferring the heat to the blocks curing the silicone matter. Another method of heating the mold cavities is circulating hot oil through the mold plate, also resulting in heat transfer to the cavity blocks curing the silicone. One of challenges using these heating methods is even heat distribution. Uneven heat distribution can cause the silicone composition not to cure evenly within the cavity, resulting in part defects. Another challenge when incorporating a runnerless system into the injection mold is maintaining a high thermal separation between the cool runnerless system which is intended to keep the silicone matter from curing until it is injected into the mold cavities. and the hot cavities designed for curing the silicone matter. Current silicone runnerless systems are designed typically using cool (approximately 21 degrees Celsius) circulating water through passages in the runnerless system keeping the runnerless system cool. The runnerless system nozzle tips are designed to seal off against the cavity blocks to ensure the silicone composition does not leak into unwanted areas of the mold. This contact of the runnerless nozzle to the heated cavity block will cure the silicone composition in the runnerless nozzle which is un-desirable. Current runnerless systems on the market address these issues by designing water to circulate adjacent to the runnerless system, thus cooling the nozzle component preventing pre-mature curing of the silicone composition. This approach to cooling while it works, it requires a considerable amount of maintenance to ensure the water passages are kept clear to maintain water circulation.

Historically silicone injection molds have difficulty preventing premature curing of the silicone due to the inability to remove heat from the nozzle tip faster then the heat going in. One solution should been to remove the nozzle tip from the heated cavity block, but this approach adds complexity and maintenance to the mold apparatus and can be prone to silicone leaks.

It has been long known and proven that latent heat of vaporization is a very efficient means to move heat. The general application of this technology are heat pipes. By using heat pipe technology the efficiencies of heat transfer are dramatically improved and when incorporated into the runnerless system, premature curing of the silicone can be prevented. Heat pipe technology can be applied to the cooling side of the runnerless system as well as the heating side of the cavity blocks. Applying this technology to the runnerless system can dramatically improve cooling and heating efficiencies, keeping the uncured silicone at a consistent and uniform low temperature preventing premature curing of the silicone. The same heat pipe technology for removing the heat can also be applied for distributing the heat in the cavity blocks. Historically the cavity blocks have been heated using heater elements or circulating hot oil. Because the placements of these heating sources are not evenly spaced, the end result is hot and cold spots in the cavity block. The non-uniform heat distribution results in uneven curing of the silicone. By creating a void within the cavity block and partially filling it with a liquid composition under a vacuum and sealing the cavity, the cavity block becomes a heat pipe distributing the heat very evenly and efficiently across the entire cavity block. Incorporating the heat pipe technology directly into the cavity block results in quick and even heat transfer to the cavity block.

Another issue with current mold designs is cavity block construction has been historically made of one cavity block with several cavities residing in the one block. This approach, while function and economical adds to uneven heat distribution to the entire cavity block. This method takes additional time when changing cavity inserts, as the new inserts are cold and require time to heat up and the heat is not distributed evenly across the entire molding surface resulting in part defects.

The cavity block in current embodiment is of a modular construction lending to a very diverse cavity arrangement of having one or more cavities per block with several blocks per mold. Each block is smaller and incorporates the heat pipe technology resulting in faster heat up times and more even heat distribution.

It is therefore an object of the invention to provide uniform heating and cooling of the silicone mold apparatus It is another object of the invention to provide a mold apparatus with annular heat pipe for cooling the runnerless nozzle.

It is another object of the invention to provide an runnerless nozzle with a guide seal in the nozzle tip for alignment and sealing of valve pin.

It is another object of the invention to provide an cavity block heated by heat pipe technology It is another object of the invention to provide a cavity block locator to retain position of cavity block during heat expansion and contraction.

It is another object of the invention to provide cooling circuit to the runnerless nozzle annular heat pipe

SUMMARY OF THE INVENTION

In accordance with the present invention, there is provided a mold apparatus used in injection molding of liquid silicone composition. The mold apparatus is made of several components aiding in the overall process. The mold apparatus has two main sections, a cold section to prevent the liquid silicone from premature curing and a heated section for curing the liquid silicone. The two sections are separated by a thermal insulating plate. The liquid silicone composition is delivered to the part cavity through orifices or channels incorporated in the mold apparatus. The metering of the flow is achieved by an actuator providing linear movement of a valve pin position in the center of the flow path of the runnerless nozzle resting against a gate orifice. The runnerless nozzle is keep cooled with an annular heat pipe technology surrounding the body of the runnerless nozzle and circulating a liquid coolant at one end of the runnerless nozzle. The cavity block incorporates heat pipe technology and receives heat from an heating element incorporated in the cavity back plate. Heat is evenly distributed within the cavity block by use of heat pipe technology.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
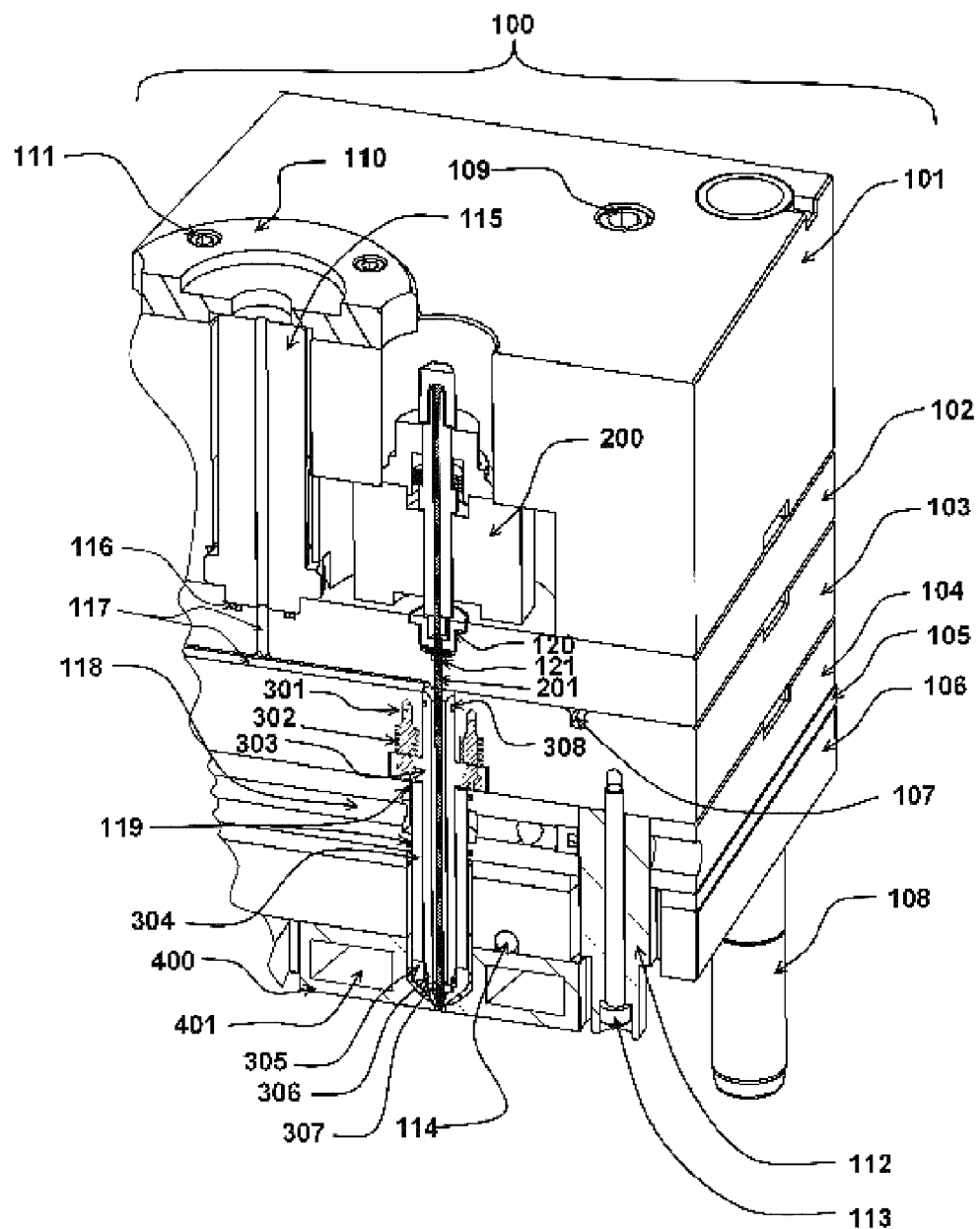
FIG. 1 is a partial side perspective section view of a mold apparatus used in injection molding of a liquid composition.

FIG. 1 is a partial side perspective section view of a mold apparatus 100 used in injection molding of a liquid composition comprising a plurality of plates encompassing a flow path 117 for which a liquid composition can travel from a molding machine to a mold cavity of a specific shape. Liquid composition is properly cured and retains cavity shape. The mold apparatus 100 comprises a back plate. Attached to mold back plate 101 is runner plate 102. Attached to runner plate 102 is nozzle plate 103. Attached to nozzle plate 103 is nozzle cooling plate 104. Attached to nozzle cooling plate 104 is cavity back plate 106. Deposed between nozzle cooling plate 104 and cavity back plate 106 is insulating plate 105. Insulating plate 105 can be of any material of very low thermal conductivity with sufficient compressive strength to withstand compression with minimal deflection. These plates are held together with mold base bolt 109. The cavity block 400 is attached to cavity back plate 106. A leader pin 108 made of temporal material is rigidly attached to mold back plate 101 and is disposed through runner plate 102, nozzle plate 103, nozzle cooling plate 104 insulating plate 105, and cavity back plate 106. The leader pin 108 provides alignment of all plates it is disposed through. Runner seal 107 is disposed between runner plate 102 and nozzle plate 103 providing a seal between the plates preventing any leakage occurring from flow path 117. Locating ring 110 is attached to back of mold back plate 101 with a plurality of locating ring bolts 111 and provides a center locating for mounting the mold apparatus 100 into an injection molding machine. Runnerless inlet nozzle 115 is disposed between locating ring 110 and runner plate 102. Runner inlet nozzle seal 116 is disposed between runnerless inlet nozzle 115 and runner plate 102 and provides seal preventing leakage of silicone composition from flow path 117. A valve pin actuator assembly 200 is assembled and rigidly attached to mold back plate 101. The valve pin actuator assembly 200 provides a linear movement of valve pin 201 which is disposed through valve pin actuator assembly 200 and firmly attached. The valve pin 201 resides concentrically through valve pin seal retainer 120, valve pin seal 121, runnerless nozzle 303, runnerless nozzle seal 307 and runnerless nozzle gate tip 305. The linear movement of the valve pin 201 creates a seal or opening to the cavity depending on its position in reference to runnerless nozzle gate tip 305 where by in the valve pin 201 forward position the valve pin 201 shuts off against the inside of runnerless nozzle gate tip 305. The conical shape of the valve pin 201 tip mates with the inside conical shape of the runnerless nozzle gate tip 305. The runnerless nozzle 303 is inserted into the nozzle plate 103 where a hole is machined into the nozzle plate 103 to accommodate the cylindrical shape of the runnerless nozzle 303. The runnerless nozzle 303 is sealed to nozzle plate 103 with runnerless nozzle plate seal 308. The runnerless nozzle 303 is attached to the nozzle plate 103 with a plurality of nozzle retainer bolt 301. A nozzle spring 302 is inserted between the runnerless nozzle 303 and the head of the screw. The springs behind the runnerless nozzle 303 allow for linear movement of runnerless nozzle 303 to compensate for the thermal expansion of cavity back plate 106 and cavity block 400 when heated. The runnerless nozzle 303 needs to be keep in a cool state to prevent the premature curing of a silicone composition. This is accomplished by attaching a annular heat tube 304 to the body of runnerless nozzle 303. The attachment can be accomplished by an interference fit between the internal diameter of the annular heat tube 304 and the outer diameter of the runnerless nozzle 303 body. The attachment of the heat tube 304 and runnerless nozzle 303 can also be accomplish with any type of liquid bonding agent. Heat tube 304 is essentially a annular heat pipe. The heat tube 304 (annular heat pipe) provides an very efficient means to move the heat generated by the contact of runnerless nozzle gate tip 305 to the cavity block 400. The heat tube 304 is cooled at opposite end of heat load by circulating a liquid composition in cooling circuit 118 around the outer diameter of the heat tube 304 which position in a hole through the nozzle cooling plate 104 and sealed with nozzle plate seal 119. The cavity back plate 106 provides heat to cavity block 400 by incorporating a tubular heater 114 element into a groove in cavity back plate 106. The heater 114 element is connected to a control device that maintains a predetermined temperature. The cavity block 400 is attached to the cavity back plate 106 and absorbs the heat generated by the heater 114. To ensure uniform temperature profile in the cavity block 400 a thermal cavity 401 is created in the cavity block 400 and is partially filled with a liquid composition. A vacuum is drawn in the thermal cavity 401 and sealed. This allows for a latent heat of vaporization to occur at low temperatures. The vaporization and condensing of the liquid composition allows for an even and efficient heat distribution through out the cavity block 400. The cavity locating post 112 is designed to keep the centerline of the cavity concentric to the centerline of the runnerless nozzle 303 aligned. The cavity locating post 112 is anchored into nozzle cooling plate 104 and extends through insulating plate 105 and cavity back plate 106 without making contact with the cavity back plate 106 or insulating plate 105. The cavity locating post 112 is held in place with cavity locating post bolt 113.

Figure 2:
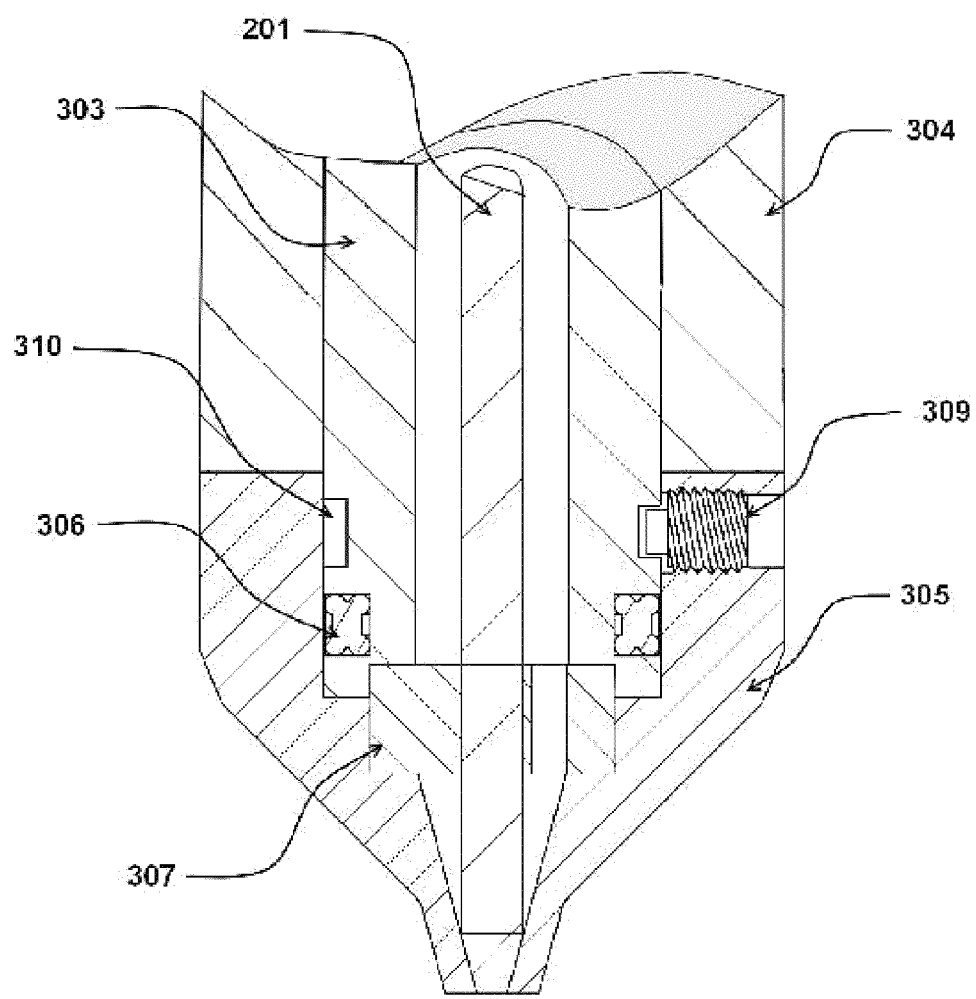
FIG. 2 is a partial side section view of an of a runnerless nozzle used in injection molding of an liquid composition.

FIG. 2 is a partial side section view of an of a runnerless nozzle 303 used in injection molding of an liquid composition. The runnerless nozzle seal 307 is captured between the runnerless nozzle gate tip 305 and the runnerless nozzle 303 creating a leak proof seal and guidance for the valve pin 201. The gate tip retainer 309 secures the runnerless nozzle gate tip 305 to runnerless nozzle 303 when inserted into runnerless nozzle gate tip 305 and extending into the runnerless nozzle retainer groove 310. The runnerless nozzle gate tip seal 306 is situated between the runnerless nozzle gate tip 305 and the runnerless nozzle 303.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A mold apparatus for use in injection molding of a liquid silicone composition, comprising:
   means for providing a partial flow path for said liquid composition from a runner plate to a runnerless nozzle, a nozzle plate providing a supportive location for a runnerless nozzle and a cavity locating post;
   means for providing cooling to a runnerless nozzle heat tube using a cooling circuit, rigidly connected to said means for providing a partial flow path of said liquid composition from said runner plate to said runnerless nozzle, said nozzle plate providing a supportive location of said runnerless nozzle and said cavity locating post;
   means for providing secure alignment of a cavity block to said runnerless nozzle, rigidly attached to said means for providing said partial flow path for a liquid composition from said runner plate to said runnerless nozzle, said nozzle plate providing a supportive location of said runnerless nozzle and said cavity locating post;
   means for providing a path for circulating a cooling media around said heat tube, centrally embedded to said means for providing cooling to said runnerless nozzle heat tube using said cooling circuit;
   means for securing said runnerless nozzle to said nozzle plate;
   means for providing a flow path from said runner plate to said cavity, threadably inserted to said means for securing said runnerless nozzle to said nozzle plate, and frangibly inserted to said means for providing a partial flow path for said liquid composition from said runner plate to said runnerless nozzle, said nozzle plate providing a supportive location of said runnerless nozzle and said cavity locating post;
   means for providing cooling to said runnerless nozzle, tightly encompassing said means for providing a partial flow path from said runner plate to said cavity;
   means for providing a gate device to said runnerless nozzle and partially housing said runnerless nozzle seal, sealably assembled to said means for providing a partial flow path from said runner plate to said cavity;
   means for securing a runnerless nozzle gate tip to said runnerless nozzle, threadably fastened to said means for providing a gate device to said runnerless nozzle and partially housing said runnerless nozzle seal;
   means for providing mechanical engagement for said gate tip retainer;
   means for providing location and guide for a valve pin while creating a leakless seal, sealably inserted to said means for providing flow path from said runner plate to said cavity;
   means for providing shape for liquid composition; and
   means for providing thermal distribution in said cavity block, internally constructed to said means for providing shape for said liquid composition.

2. The mold apparatus in accordance with claim 1, wherein said means for providing a partial flow path for said liquid composition from said runner plate to said runnerless nozzle and providing a supportive location of said runnerless nozzle and said cavity locating post comprises a said nozzle plate.

3. The mold apparatus in accordance with claim 1, wherein said means for providing cooling to said runnerless nozzle heat tube using cooling circuit comprises a nozzle cooling plate.

4. The mold apparatus in accordance with claim 1, wherein said means for providing secure alignment of said cavity block to said runnerless nozzle comprises a cavity locating post.

5. The mold apparatus in accordance with claim 1, wherein said means for providing a path for circulating a cooling media around said heat tube comprises a cooling circuit.

6. The mold apparatus in accordance with claim 1, wherein said means for securing said runnerless nozzle to said nozzle plate comprises a nozzle retainer bolt.

7. The mold apparatus in accordance with claim 1, wherein said means for providing a flow path from said runner plate to said cavity comprises a said runnerless nozzle.

8. The mold apparatus in accordance with claim 1, wherein said means for providing cooling to said runnerless nozzle comprises an annular heat tube.

9. The mold apparatus in accordance with claim 1, wherein said means for providing said gate device to said runnerless nozzle and partially housing said runnerless nozzle seal comprises a runnerless nozzle gate tip.

10. The mold apparatus in accordance with claim 1, wherein said means for securing said runnerless nozzle gate tip to said runnerless nozzle comprises a gate tip retainer.

11. The mold apparatus in accordance with claim 1, wherein said means for providing mechanical engagement for said gate tip retainer comprises a runnerless nozzle retainer groove.

12. The mold apparatus in accordance with claim 1, wherein said means for providing location and guide for said valve pin while creating a leakless seal comprises a runnerless nozzle seal.

13. The mold apparatus in accordance with claim 1, wherein said means for providing shape for said liquid composition comprises a cavity block.

14. The mold apparatus in accordance with claim 1, wherein said means for providing thermal distribution in said cavity block comprises a thermal cavity.

15. A mold apparatus for use in injection molding of a liquid silicone composition, comprising:
- a nozzle plate, for providing a partial flow path for said liquid composition from a runner plate to a runnerless nozzle, said nozzle plate providing supportive location of said runnerless nozzle and said cavity locating post;
- a nozzle cooling plate, for providing cooling to said runnerless nozzle heat tube using said cooling circuit, rigidly connected to said nozzle plate;
- a cavity locating post, for providing secure alignment of said cavity block to said runnerless nozzle, rigidly attached to said nozzle plate;
- a cooling circuit, for providing a path for circulating a cooling media around said heat tube, centrally embedded to said nozzle cooling plate;
- a nozzle retainer bolt, for securing said runnerless nozzle to said nozzle plate;
- a runnerless nozzle, for providing a flow path from said runner plate to said cavity, threadably inserted to said nozzle retainer bolt, and frangibly inserted to said nozzle plate;
- a annular heat tube, for providing cooling to said runnerless nozzle, tightly encompassing to said runnerless nozzle;
- a runnerless nozzle gate tip, for providing gate device to said runnerless nozzle and partially houses said runnerless nozzle seal, sealably assembled to said runnerless nozzle;
- a gate tip retainer, for securing said runnerless nozzle gate tip to said runnerless nozzle, threadably fastened to said runnerless nozzle gate tip;
- a runnerless nozzle retainer groove, for providing mechanical engagement for said gate tip retainer;
- a runnerless nozzle seal, for providing location and guide for said valve pin while creating a leakless seal, sealably inserted to said runnerless nozzle;
- a cavity block, for provides shape for a liquid composition; and
- a thermal cavity, for provides thermal distribution in said cavity block, internally constructed to said cavity block.

16. The mold apparatus as recited in claim 15, further comprising:
- a runner plate, for structural support for said runnerless inlet nozzle and providing a partial flow path for said liquid composition from said runnerless inlet nozzle to said runnerless nozzle, rigidly connected to said nozzle plate.

17. The mold apparatus as recited in claim 15, further comprising:
- a cavity back plate, for providing heat and a mounting surface for said cavity block, snugly mounted to said cavity block.

18. A mold apparatus for use in injection molding of a liquid silicone composition, comprising:
- a runner plate, for structural support for said runnerless inlet nozzle and providing a partial flow path for said liquid composition from said runnerless inlet nozzle to said runnerless nozzle;
- a nozzle plate, for providing a partial flow path for said liquid composition from said runner plate to said runnerless nozzle, and providing a supportive location of said runnerless nozzle and said cavity locating post, rigidly connected to said runner plate;
- a nozzle cooling plate, for providing cooling to said runnerless nozzle heat tube using cooling circuit, rigidly connected to said nozzle plate;
- a cavity back plate, for providing heat and a mounting surface for said cavity block;
- a cavity locating post, for providing secure alignment of said cavity block to said runnerless nozzle, rigidly attached to said nozzle plate;
- a cooling circuit, for providing a path for circulating a cooling media around said heat tube, centrally embedded to said nozzle cooling plate;
- a nozzle retainer bolt, for securing said runnerless nozzle to said nozzle plate;
- a runnerless nozzle, for providing a flow path from said runner plate to said cavity, threadably inserted to said nozzle retainer bolt, and frangibly inserted to said nozzle plate;
- a annular heat tube, for providing heat to said runnerless nozzle, tightly encompassing to said runnerless nozzle;
- a runnerless nozzle gate tip partially housing said runnerless nozzle seal, sealably assembled to said runnerless nozzle;
- a gate tip retainer, for securing said runnerless nozzle gate tip to said runnerless nozzle, threadably fastened to said runnerless nozzle gate tip;
- a runnerless nozzle retainer groove, for providing mechanical engagement for said gate tip retainer;
- a runnerless nozzle seal, for providing location and guide for said valve pin while creating a leakless seal, sealably inserted to said runnerless nozzle;
- a cavity block, for providing shape for said liquid composition, snugly mounted to said cavity back plate; and
- a thermal cavity, for providing thermal distribution in said cavity block, internally constructed to said cavity block.

* * * * *